United States Patent

[11] 3,554,360

[72] Inventor Jorgen S. Bildsoe
 Royal Oak, Mich.
[21] Appl. No. 751,935
[22] Filed Aug. 12, 1968
[45] Patented Jan. 12, 1971
[73] Assignee Seatech Engineering, Inc.
 Southfield, Mich.
 a corporation of Michigan

[54] CONVEYOR
 15 Claims, 9 Drawing Figs.
[52] U.S. Cl. .................................................. 198/189,
 198/181
[51] Int. Cl. ..................................................... B65g 17/06
[50] Field of Search ............................................ 198/181,
 189; 104/20, 25

[56] References Cited
 UNITED STATES PATENTS
1,191,434 7/1916 Keith ............................. 198/181
3,211,279 10/1965 Smith ........................... 198/181X
3,379,300 4/1968 Karr .............................. 198/181
3,399,758 9/1968 Karr .............................. 198/181

FOREIGN PATENTS
603,291 9/1934 Germany ..................... 198/189
Primary Examiner—Edward A. Sroka
Attorney—Harness, Dickey and Pierce ABSTRACT: A conveyor assembly comprising a plurality of generally crescent-shaped, adjacently oriented conveyor pallets presenting a flat article supporting surface and adapted to follow both linear and nonlinear paths of travel which may either be horizontal or inclined upwardly or downwardly; the conveyor pallets being movable longitudinally along the aforesaid paths in response to actuation of one or more friction drive assemblies disposed below the pallets and adapted to operate independently of one another and without synchronization or mechanical or electrical interlocks; the conveyor pallets being supported for longitudinal movement upon an associated support structure which is of an extremely compact, low profile construction and comprises a series of modules that may be conveniently added, removed or rearranged to selectively alter the layout of the path of travel of the conveyor pallets.

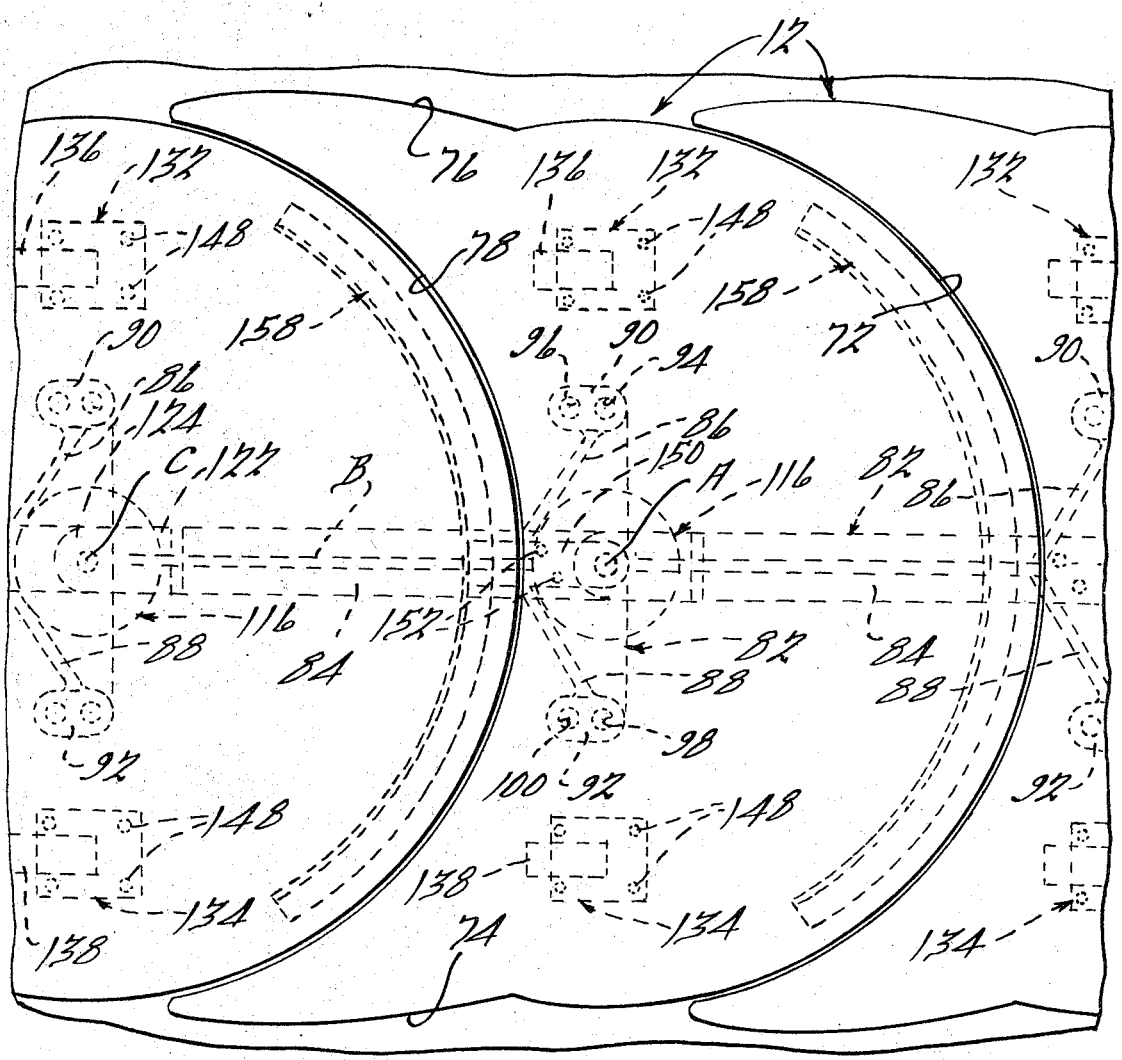
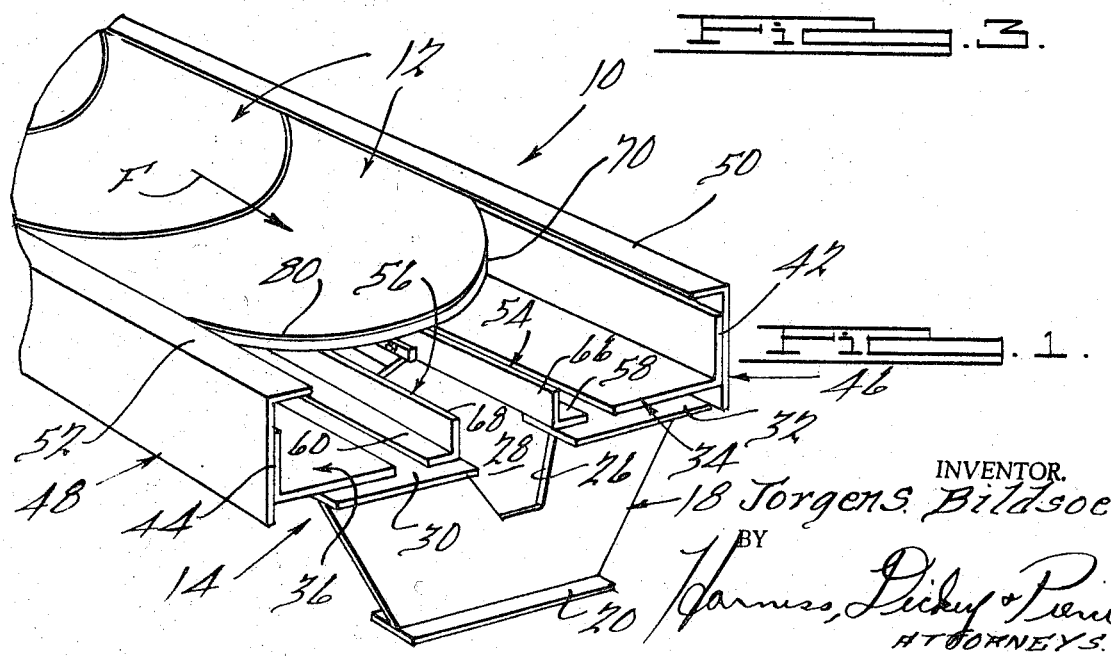

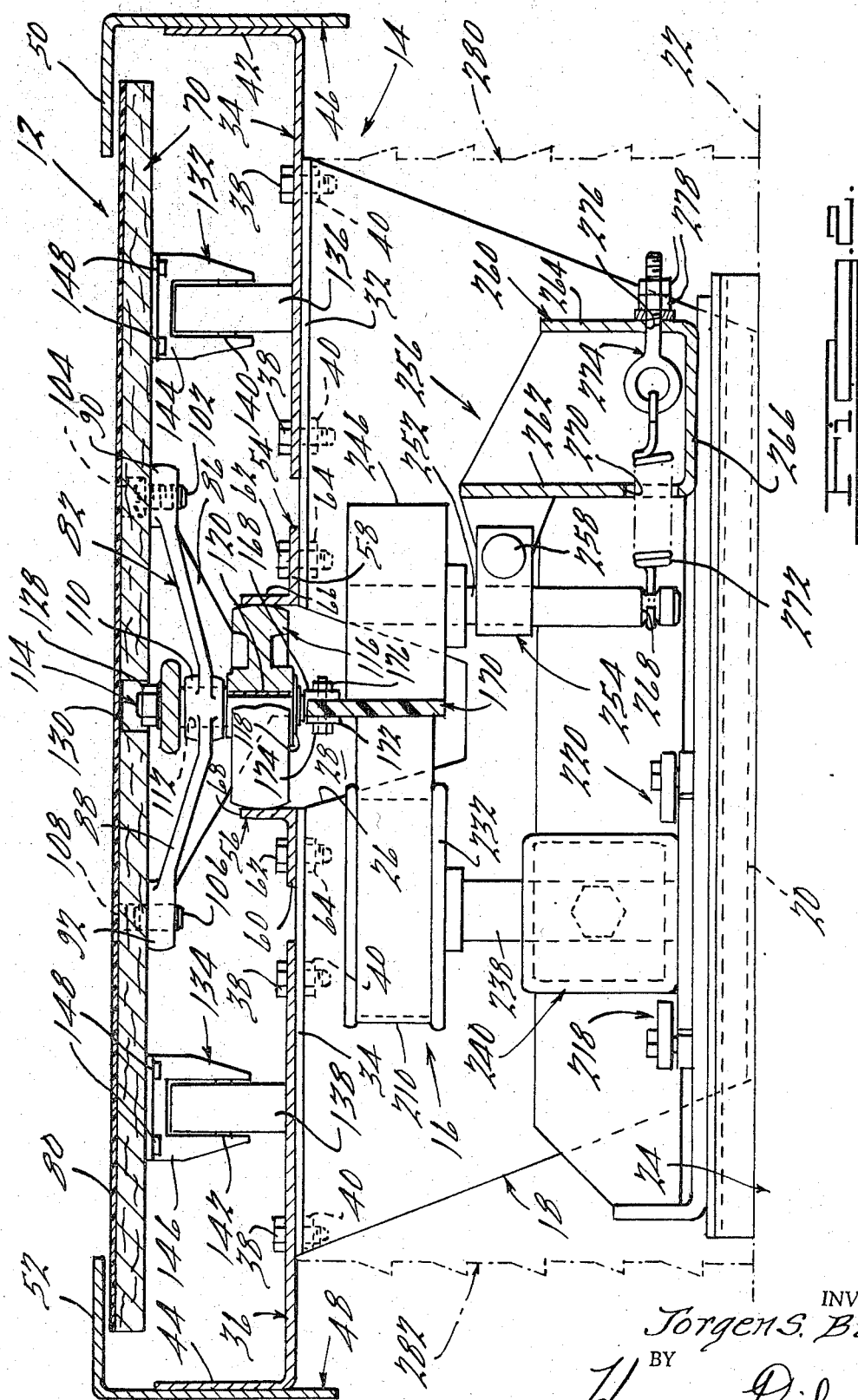

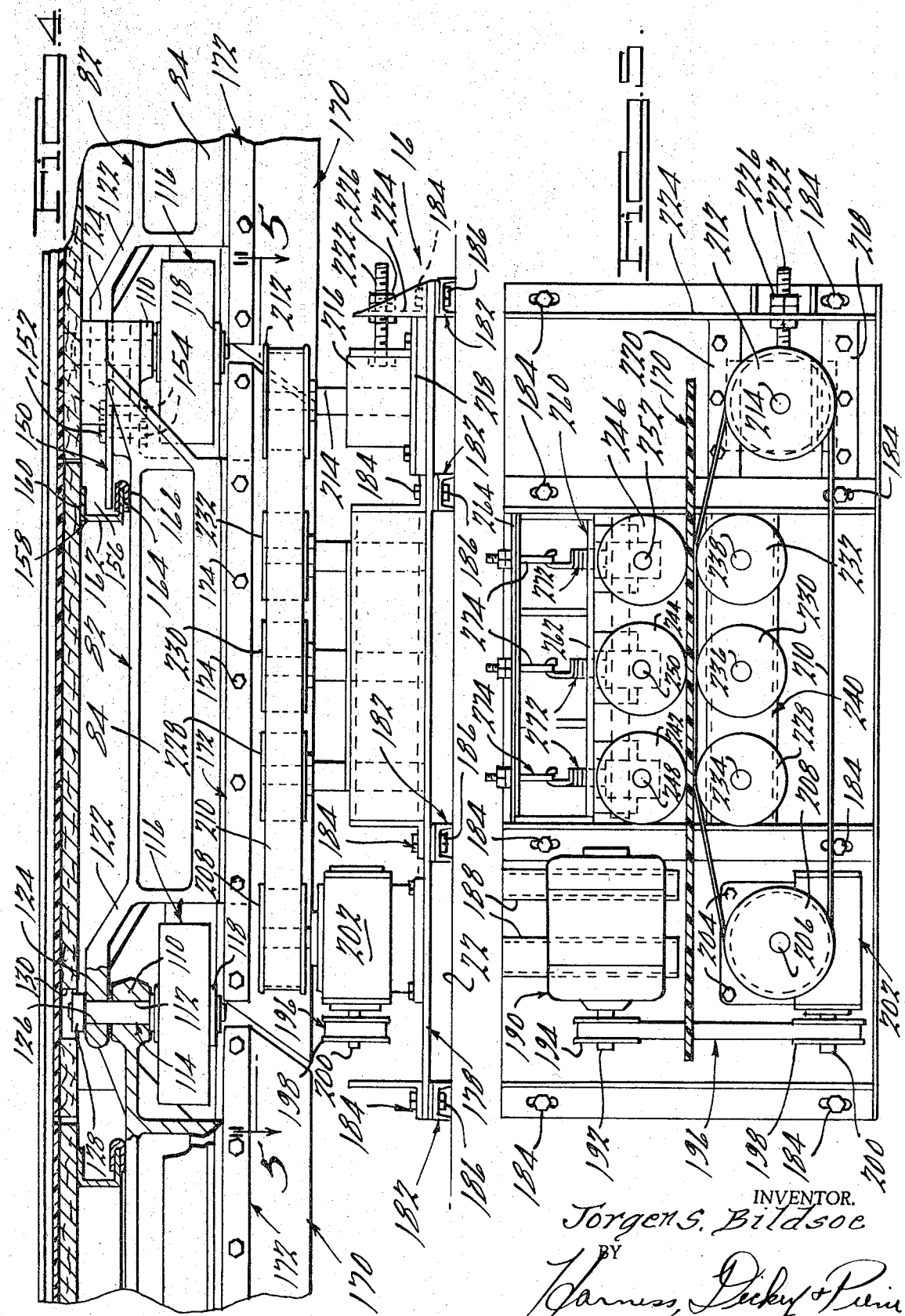

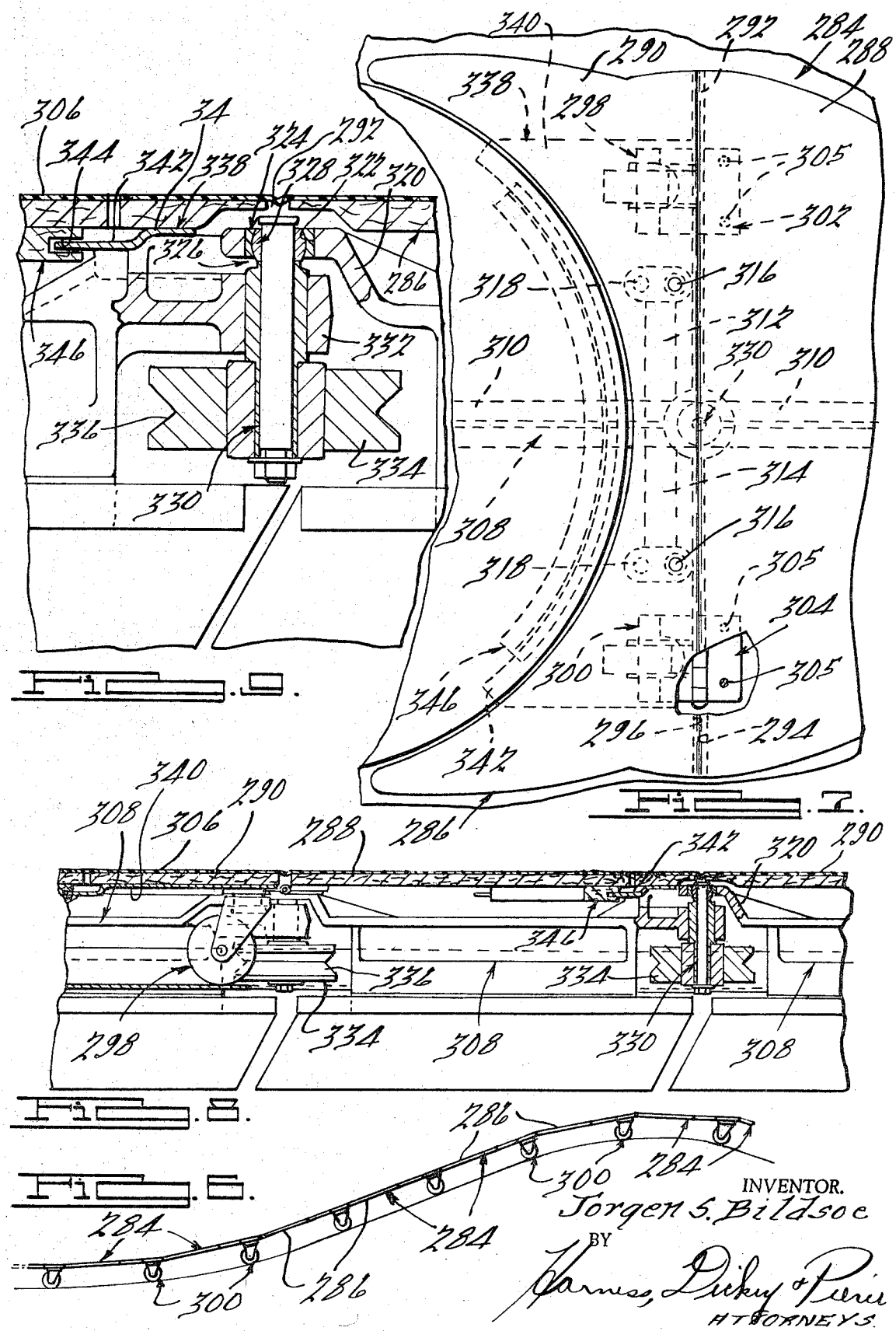

CONVEYOR

SUMMARY OF THE INVENTION

This invention relates generally to an article handling device and, more particularly, to a new and improved conveyor assembly for transporting packages, baggage, cargo, freight, workpieces and any other desired objects or articles along a preselected path or route.

It is accordingly a general object of the present invention to provide a new and improved conveyor assembly.

It is a more particular object of the present invention to provide a new and improved conveyor assembly provided with a unique friction drive system which has been designed for reliability, simplicity, serviceability, quietness and compactness.

It is another object of the present invention to provide a conveyor assembly of the above character which may be provided with one or more drive assemblies which are simultaneously operable without the need for any synchronization or mechanical or electrical interlocks therebetween, and wherein the drive assemblies may be located at any position along the conveyor (even on a turn if desired) and may be easily added or removed in accordance with conveyor usage.

It is a further object of the present invention to provide a new and improved conveyor assembly of the above character having a relatively flat or low profile so as to minimize the time and effort required in placing articles on the assembly and removing said articles after the same have been conveyed to some predetermined destination.

It is another object of the present invention to provide a conveyor assembly of the above described type wherein the drive assemblies are of a sufficiently compact design so as to eliminate the need for any pits or similar recessed areas heretofore frequently required for mounting conveyor drive assemblies below their associated conveyors.

It is yet another object of the present invention to provide a new and improved conveyor assembly which is of a modular construction whereby individual conveyor units or subassemblies may be easily handled and conveniently removed and installed without requiring any field welding or similar complicated assembly procedures; a further object being that the path of travel or route layout of the conveyor assembly may be easily altered by convenient disassembly and rearrangement of the modules.

It is yet a further object of the present invention to provide a new and improved conveyor assembly of the above described type wherein spare modules or drive assemblies may be quickly placed into the conveyor system in the place of those removed for service where and when convenient, with the result that conveyor downtime is reduced to a minimum.

It is another object of the present invention to provide a new and improved conveyor assembly which is adapted to operate on multiple, vertically spaced levels without the need for separate powered turns or right angle transfers. A related object concerns the provision of such a conveyor assembly which is also capable of turns in one plane and which has a substantially continuous load carrying surface throughout the length of the conveyor.

It is a further object of the present invention to provide a new and improved conveyor assembly which will achieve maximum floor space utilization by virtue of the fact that the assembly may be conveniently routed around building obstructions utilizing minimum radius turns, and parallel runs of the conveyor can be side-by-side with no significant lost space therebetween.

It is a still further object of the present invention to provide a new and improved conveyor assembly wherein all component parts thereof are easily accessible for inspection, maintenance and replacement.

It is yet another object of the present invention to provide a new and improved conveyor assembly which is extremely smooth and quiet in operation by reason of the fact that there is no metal-to-metal contact between the various moving parts of the drive system therefor. A related object concerns the provision of such a conveyor which obviates the need for drive line takeups such as are required for chain conveyors.

It is a further object of the present invention to provide a conveyor assembly which requires no lubrication between the drive assemblies and the conveyor pallets driven thereby, and wherein the driving means is of a noncorrosive character so as to provide for all weather usage. A further related object of the present invention is to provide a conveyor assembly utilizing nonlubricated components thereby making it particularly desirable for sanitary applications because of the absence of lubricant which might tend to contaminate the article conveying surfaces thereof, and because it may be steam cleaned without requiring relubrication.

It is yet another object of the present invention to provide a conveyor assembly having a drive system which is self-adjusting for wear, thereby minimizing maintenance requirements.

It is still another object of the present invention to provide a conveyor assembly of the above character wherein the conveyor width may be conveniently varied without affecting the operation of the associated drive assemblies.

It is another object of the present invention to provide a conveyor assembly wherein considerable misalignment may exist between the conveyor itself and the drive unit therefor without adversely affecting the operation of the system, thereby permitting more economical, lower tolerance construction and assembly.

Yet a further object of the present invention concerns the provision of a system incorporating a plurality of articulated links or members which both support the articles being conveyed and also carry the driving loads.

It is yet another object of the present invention to provide a conveyor assembly of the above character which is of an extremely simple design, is economical to commercially manufacture, and is of a rugged and durable construction so that it will have a long and effective operational life.

Other objects and advantages of the present invention will become apparent from the following description, taken in conjunction with the accompanying drawings.

BRIEF DESCRIPTION OF THE DRAWINGS

FIG. 1 is a perspective view of a portion of a conveyor embodying the principles of the present invention;

FIG. 2 is a transverse sectional view of a portion of the conveyor shown in FIG. 1;

FIG. 3 is a plan view of a portion of the conveyor shown in FIG. 1, with certain parts broken away;

FIG. 4 is a longitudinal sectional view of a portion of the conveyor shown in FIG. 1;

FIG. 5 is a sectional view taken along line 5–5 in FIG. 4;

FIG. 6 is a side elevational view of a second embodiment of the present invention, shown schematically;

FIG. 7 is a plan view of a portion of the conveyor shown in FIG. 6, with certain parts broken away;

FIG. 8 is a longitudinal sectional view of a portion of the conveyor shown in FIG. 6; and FIG. 9 is an enlarged longitudinal sectional view of a portion of the conveyor shown in FIG. 8.

DESCRIPTION OF THE PREFERRED EMBODIMENTS

For purposes of clarity of description, the terms "inwardly" and "outwardly" will have reference to the longitudinal geometric center line of the conveyor assembly of the present invention and the various component parts thereof. Similarly, the terms "forwardly" and "rearwardly" and derivatives thereof will have reference to the direction of travel of the conveyor system, with the forward direction being indicated by the arrow F in FIG. 1.

Referring now in detail to the drawings, a conveyor assembly 10, in accordance with a preferred embodiment of the present invention, is generally shown as comprising a plurality of longitudinally adjacently oriented conveyor dollies or pallets, generally designated 12, which are supported for movement or travel along a path defined by an associated support structure, generally designated 14, having one or more drive assemblies 16 operatively associated therewith and adapted to impart longitudinal movement to the pallets 12. As will hereinafter be described in detail, the structure 14 is adapted to support the pallets 12 for movement along both linear and nonlinear (curved) paths of travel in accordance with any particular operational environment. Preferably, the path of travel of the pallets 12 defined by the support structure 14 is in the form of a closed loop or continuous endless circuit, although such a layout is not absolutely essential to effective operation of the conveyor assembly 10 in the broadest sense because it could be utilized as a train, the length of which is greater than the spacing between drive units 16. By virtue of the fact that the support structure 14 is substantially identical in construction and operation throughout the entire length of the conveyor assembly 10, only a typical cross section thereof is illustrated in the drawings and described herein, it being apparent, of course, that the description of said typical section will be readily applicable to the entire length of the support structure.

Referring now in detail to the construction of the support structure 14, as best illustrated in FIGS. 1 and 2 structure 14 comprises a plurality of longitudinally spaced, vertically extending upright support members, generally designated 18, which may be generally trapezoidal in shape and provided with horizontally extending bottom support flanges or base plates 20 along the lower sides thereof adapted to bear upon and be supported by a generally horizontally extending upper surface 22 of a suitable support structure representatively designated by the number 24 in FIG. 2. Such could be merely a floor. As will be apparent, vertical support members 18 are adapted to be spaced longitudinally along the conveyor assembly 10 and to be oriented in positions extending substantially perpendicular to the longitudinal center line of the conveyor. The support members 18 are formed with downwardly converging recessed areas or cutaway portions 26 which define a longitudinally extending channel or trough 28 located centrally along the length of the conveyor. The support members 18 are each provided with a pair of horizontally extending upper support flanges 30 and 32 which may be welded to the upper edges of the support members adjacent the opposite sides of the cutaway portions 26. As illustrated in FIG. 2, support flanges 30 and 32 of each of the support members 18 lie in a common horizontal plane.

Disposed directly above and supported upon flanges 30 and 32 are a pair of laterally spaced, generally horizontally disposed bottom plates 34 and 36 which extend longitudinally the entire length of the conveyor. As illustrated in FIG. 2, plates 34 and 36 are adapted to be fixedly secured to the upper sides of support flanges 30 and 32, respectively, preferably by suitable screws or bolts 38 and associated nuts 40. The plates 34 and 36 may be spaced laterally outwardly from the outer sides of recessed areas 26 and may be formed with generally vertically upwardly extending flange sections 42 and 44 along the outer edges thereof. Flange sections 42 and 44 are preferably, although not necessarily, coextensive with the bottom plates 34 and 36 and are adapted to support generally vertically extending side or trim plates 46 and 48, respectively, along the outer sides thereof. Trim plates 46 and 48 are coextensive with support structure 14 and may be fixedly secured to the laterally outer sides of the flange sections 42 and 44 by any suitable means, such as welding or bolting. The uppermost portions of the trim plates may be formed with horizontally disposed, laterally inwardly extending marginal flanges 50 and 52, respectively, which are adapted to overlie the outer edges of conveyor pallets 12 as they traverse along the conveyor assembly 10, as will later be described.

Along the inner edges of bottom plates 34 and 36 are mounted a pair of longitudinally extending, laterally spaced parallel guideway channel defining members 54 and 56. These members comprise generally horizontally extending sections 58 and 60, respectively, which are adapted to be fixedly secured to the flanges 30 and 32, respectively, by suitable screws or bolts 62 and nuts 64, and vertically extending, spaced parallel guideway sections 66 and 68, respectively, which extend upwardly from and along the opposite sides of the central trough 28 defined by the cutaway portions 26 of the support members 18. Members 54 and 56 extend the length of the conveyor and are adapted to provide guide means for the conveyor pallets 12 as the latter travel longitudinally along the path of the conveyor.

A particularly noteworthy feature of the above described construction resides in the fact that it is of an extremely compact and low-profile design, thereby enabling articles to be conveniently placed upon and removed from the conveyor pallets 12 traveling therealong. Such a design also permits table top application, as may be required for production assembly or package handling. Still another feature of the above described construction resides in the fact that it may be provided in the form of individual prefabricated subassemblies or modules which may be conveniently assembled and disassembled without requiring field welding or other complicated and expensive field assembly procedures. The individual modules may be easily disassembled, rearranged and added or removed in order to alter or revise the conveyor path, and spare support structure modules may be kept on hand and be quickly placed onto a system so those removed may be rapidly serviced where and when convenient, thereby minimizing downtime.

Referring now in detail to the construction and operation of the conveyor pallets 12, it will be noted that since each of the plurality of pallets are identical in construction, only a single pallet 12 will be described in detail, it being apparent that said description will be readily applicable to the other of said pallets. Accordingly, the reference numerals used to identify the various component parts of the one pallet described in detail will be applicable to the corresponding parts of all of the other pallets.

As best seen in FIGS. 2 and 3, each of the pallets 12 comprises a generally horizontally disposed upper load carrying surface or platform 70 which may be fabricated of any suitable strong, rigid material, such as plywood, composition flake board or the like. Alternatively, the platform 70 may be fabricated out of a suitable metal, such as aluminum or stainless steel, whereby they may be subjected to steam or similar cleaning operations where extremely sanitary conditions are desired. Each of the platforms 70 is generally crescent-shaped in plan view and comprises a forward or leading arcuate-shaped edge 72 which lies substantially along the circumference of a circle having a center at point A in FIG. 3. The rearwardmost portions of the arcuate forward edge 72 terminate and blend into arcuate-shaped side edges 74 and 76 which lie along a circle having a center at point B in FIG. 3. Platforms 70 have rearward or trailing edges 78 which are defined substantially by a circle having its center at point C in FIG. 3, which point C also is the center of the circle defining the forward edge 72 of the platform 70 of the next rearwardly adjacent pallet 12, with the result that the platforms 70 are of a complementary configuration and provide a substantially smooth, flat and continuous article supporting surface when assembled in the manner best illustrated in FIG. 1. As previously mentioned, platforms 70 are dimensioned so that the laterally outer edges thereof underlie marginal flanges 50 and 52 of side plates 46 and 48. Point C preferably lies behind points A and B, and each arc is preferably of the same radius. This permits each pallet to turn with respect to the next adjacent trailing pallet without substantially reducing the overall areas of the article carrying surfaces or requiring extra wide flanges 50 and 52.

The uppermost surfaces of pallet platforms 70 are substantially flat in most cases, and if desired may be provided with a top layer 80 of any suitable material. For example, if slip resistance, resilience, and/or scuff resistance is desired a layer of vinyl or rubber or the like may be secured in any suitable manner to the upper surfaces of the pallets. Alternatively, if a more slippery surface is desired, or one which is particularly sanitary, or scuff resistant, a layer of stainless steel or aluminum or the like may be provided.

Each conveyor pallet 12 comprises a generally T-shaped carriage frame member, generally designated 82, which is disposed below the associated platform 70 equidistant from the opposite sides thereof. Frame members 82 each comprise a main longitudinally extending section 84 which extends along the center line of the conveyor assembly 10 at a position spaced slightly below the lower surface of the associated platform 70, as best seen in FIG. 4. Each frame member 82 also comprises a pair of laterally outwardly extending arm sections 86 and 88 which are integrally connected to frame section 84 at the forward end thereof, and are inclined upwardly from section 84 to a position directly below the associated conveyor platform 70. As shown in FIGS. 2 and 3, the laterally outer ends of arm sections 86 and 88 are formed with mounting portions 90 and 92, respectively, each provided with a pair of longitudinally spaced holes 94, 96 and 98, 100, respectively. Holes 94 and 98 are preferably internally threaded to threadably receive mounting screws or bolts 102 which extend downwardly through suitable countersunk aligned openings 104 formed in the associated conveyor platform 70. Holes 96 and 100 are adapted to receive and support the lower ends of a pair of locating pins, generally designated 106, which project upwardly from mounting portions 90 and 92 of frame member 82 into suitable aligned openings 108 formed in conveyor platform 70. As will be apparent, bolts 102 and pins 106 are adapted to fixedly secure frame members 82 to the underside of the associated platform 70 in a manner so as to positively prevent any relative movement therebetween during the operation of the conveyor. As best illustrated in FIG. 3, frame members 82 are attached to the associated conveyor platforms 70 at positions wherein the longitudinally extending sections 84 thereof extend rearwardly of and underlie the platform 70 of the next rearwardly adjacent conveyor platform, for purposes hereinafter to be described.

The forwardmost or leading end of each of the frame members 82 is formed with a section 110 between associated arm sections 86 and 88 having therein a generally vertically extending bore 112. Disposed within each bore 112 is a generally vertically extending connecting pin or shaft 114, the lower end of which extends below the lower sides of section 110 and is adapted to rotatably support a generally horizontally disposed guide roller 116. Each roller 116 is retained on the lower end of shaft 114 by a suitable snap ring or the like 118, and a suitable antifriction sleeve bushing or bearing 120 is preferably provided on the lower end of shaft 114 to provide for free rotation of roller 116. As best illustrated in FIG. 2, each roller 116 is supported on shaft 114 at a position wherein the roller is disposed between guideway sections 66 and 68 of channel members 54 and 56, with the result that the rollers 116 will function to maintain frame members 82 and platforms 70 supported thereon centrally of the support structure 14 as the conveyor pallets 12 move longitudinally therealong.

As shown in FIG. 4, the rearward or trailing ends of carriage frame members 82 are formed with an integral rearwardly and upwardly extending connecting section 122, which section is formed with a generally horizontally disposed portion 124 having therethrough a central annular opening 126. Upon assembly of conveyor pallets 12 along support structure 14, the portion 124 of each of the frame members is aligned with section 110 of the next rearwardly adjacent frame member so that the upper end of shaft 114 will extend upwardly through opening 126. The rearward end of each of the frame members is thus pivotably connected to the forward end of the next rearwardly adjacent frame member. The upper end of shaft 14 is preferably externally threaded above a suitable shoulder to receive a suitable retaining nut or the like 128 for the purposes of maintaining frame portion 124 positively, yet pivotably, secured thereto. Access to nuts 128 is preferably provided by suitable openings 130 in conveyor platforms 70 in order to permit convenient assembly and disassembly of the pallets.

It will be seen that upon assembly of the pallets, the rearward or trailing edge of each of the platforms is disposed directly forwardly of the forward or leading edge 72 of the rearwardly adjacent platform, and that carriage frame members 82 of the pallets are pivotably secured to one another along the longitudinal center line of support structure 14. Accordingly, pallets 12 are capable of pivoting or rotating relative to one another within predetermined limits so that the conveyor may assume a generally curved configuration, whereby articles may be conveyed along nonlinear as well as linear paths of travel commensurate with various installation requirements. It will be noted, of course, that the radius about which the conveyor may turn is limited essentially by the configuration of pallet platforms 70, since too small a turning radius would result in a interference between the rearward ends of each platform and the lateral sides of the next rearwardly adjacent platform. By way of example, it has been determined that a minimum inside turning radius of approximately 23 inches may be achieved when the platforms 70 are of a configuration similar to that illustrated in FIG. 3 and are approximately 28 to 30 inches wide. Such a minimum turning radius, of course, may be varied by a proper choice of dimensions and design of the platforms 70, as will be apparent to the skilled artisan.

As best illustrated in FIGS. 2 and 3, the underside of each of the pallet platforms 70 is provided with a pair of laterally spaced swivel castor assemblies 132 and 134 which comprise rotatably mounted rollers 136 and 138, respectively, rotatably supported by suitable axles 140 and 142 on a pair of bifurcated swivel support brackets 144 and 146. Brackets 144 and 146 are adapted to be fixedly secured to the lower side of the associated platforms 70 by means of suitable screws, bolts or the like 148, whereby the rollers 136 and 138 will ride or bear upon the upper surface of the bottom plates 34 and 36 to thereby support pallet platforms 70 as they longitudinally traverse support structure 14. It will be noted that although in the embodiment of the conveyor assembly 10 illustrated herein the castor assemblies 132 and 134 are mounted directly upon the lower side of the associated pallet platforms 70 at a position spaced laterally outwardly from the outer ends of arm sections 86 and 88, for certain applications and for convenience in manufacturing the castor assemblies 132 and 134 may be mounted directly upon the outer ends of the arm sections 86 and 88. Alternatively, a plurality of castors may be mounted upside down on bottom plates 34 and 36 so that the bottom surfaces of platform 70 will ride on the castors. Other friction-free support means will be apparent to those skilled in the art.

It will be seen from the above description, that each of the conveyor pallets 12 is supported at three spaced locations for movement longitudinally of support structure 14. Such a "3-point" support for pallets 12 permits the conveying of relatively heavy loads on the pallets as well as provides for ease in assembly, extreme stability, freeness of movement, and maximum control.

In order to positively maintain the conveyor platforms 70 in a horizontal coplanar relation as the pallets traverse support structure 14, and particularly when the pallets traverse around curves, each of the pallets is provided with a rearwardly extending, horizontally disposed keeper plate 150 which is adapted to be fixedly secured to the upper side of carriage frame 82 directly rearwardly of arm sections 86 and 88 by means of a pair of suitable screws or bolts 152 and nuts 154. As best seen in FIGS. 3 and 4, the keeper plates 150 extend rearwardly of the trailing edges 78 of conveyor platforms 70 and have the rearward ends thereof nestingly received within forward opening channels or recesses 156 defined by elongated, arcuate-shaped channel members, generally designated 158, mounted one on the underside of the forward edge of each of the platforms 70. Channel members 156 are preferably, although not necessarily, generally C-shaped in cross section and comprise upper, generally horizontally extending mounting sections 160 adapted to be fixedly secured to the lower side of the associated conveyor platform 70. Channel members 158 further comprise vertically disposed side sections 162 and bottom or lower flange sections 164, the latter of which are preferably provided with a suitable wear resistant, low friction covering 166. As best illustrated in FIG. 3, the channel member 158 of each of the pallets 12 is substantially coextensive with the forward edge 72 of the associated platform 70 and lies substantially along the circumference of a circle, the center of which is the axis of the shaft 114. It will be seen that the lower sides of channel members 158 are adapted to bear upon the adjacent upper surface of carriage frame section 84 to thereby support the forwardmost part of platform 70.

In operation of conveyor assembly 10, it will be seen that lower flange sections 164 of channel members 158 are disposed interjacent the lower sides of keeper plates 150 and the upper sides of frame sections 84 so as to maintain conveyor platforms 70 in a smoother substantially coplanar relation as conveyor pallets 12 travel along support structure 14. As pallets 12 traverse curved sections of support structure 14, keeper plates 150 will be maintained within channels 156 by virtue of the arcuate or circumferential configuration of channel members 158, thereby effectively maintaining all of platforms 70 in coplanar horizontal relation when the pallets traverse such curved sections of the support structure, as well as when they traverse substantially straight or linear paths.

In the broadest sense, the drive system of the conveyor of the present invention may be characterized as a friction drive, and generally comprises a multiplicity of driven friction elements, one on each conveyor pallet 12, and one or more of the aforementioned drive assemblies 16 disposed below the path of travel of the pallets and adapted to frictionally engage the aforesaid elements to thereby impart longitudinal movement to the pallets. It is an improvement of the system disclosed in U.S. Pat. No. 3,211,279. By virtue of the fact that each of the drive assemblies 16 is preferably identical in construction and operation to all the others, only a single drive unit will be described in detail herein, it being apparent that this description will be applicable to any additional assemblies 16 which may be incorporated in the conveyor. More particularly, as best illustrated in FIGS. 2 and 4, it will be seen that the lower side of the longitudinally extending section 84 of each of the carriage frame members 82 is provided with a generally vertically downwardly extending mounting flange portion 168 which projects forwardly and rearwardly of frame section 84 to a position substantially aligned at the forward end thereof with the center of the bore 112 and at the rearward end thereof with the center of the opening 126. Flange portion 168 of each of the carriage frame members 82 is adapted to support a flat elongated, generally vertically disposed, downwardly depending or suspended driven friction element 170 which has the upper end thereof clamped between flange portion 168 and an elongated retaining or clamping plate 172 located on the laterally opposite side of element 170 from flange portion 168. As illustrated, suitable longitudinally spaced screws or bolts 174 extend through clamping plate 172, flange portion 168 and upper end of friction drive element 170 and are provided with suitable nuts 176 mounting element 170 in the position best shown in FIG. 4. Friction elements 170 are preferably fabricated of a tough, flexible, wear resistant material such as hard rubber, or rubber impregnated laminated fabric material such as the material commonly used in the fabrication of conveyor belts, or the like. Although in many applications it is preferable that friction elements 170 be flexible, in certain applications they may be formed of a relatively rigid material, such as the material from which brake or clutch linings are fabricated. As best seen in FIG. 4, the longitudinally forward and rearward end edges of each of friction elements 170 slope downwardly and rearwardly, with the result that the adjacent ends of the friction elements on adjacent pallets longitudinally overlap one another. With this arrangement, the drive assemblies, as hereinafter to be described, frictionally engage each successive frictional element 170 before disengaging the forwardly immediately adjacent frictional element with the result that smooth continuous longitudinal movement will be imparted to the pallets as they are driven by assemblies 16.

Referring now in detail to the construction and operation of one of the drive assemblies 16, as best seen in FIGS. 4 and 5 the assembly 16 comprises a generally horizontally extending base or bottom support plate 178 adapted to be supported upon a suitable horizontally extending surface of support structure 24 by means of a plurality of longitudinally spaced, laterally extending support legs or channels 182 fixedly secured to the lower side of plate 178 by means of suitable screws or bolts 184 and nuts 186. Channels 182 may either be bolted to structure 24, or may merely rest thereon on high friction resilient machine mounting pads.

As illustrated in FIG. 5, operatively mounted at the rearward end of support plate 178 by any suitable means, such as a mounting block assembly 188, is an electrically energized drive motor 190 having a conventional rotatable drive shaft 192 to which is affixed a drive sheave or pulley 194. Pulley 194 is adapted to rotatably carry a conventional V-type drive belt or the like 196 which transmits motive power from the motor to an input pulley 198 on shaft 200 of a speed reducing mechanism 202 fixedly secured by means of suitable screws or bolts 204 to the upper side of plate 178 laterally opposite the motor 190. Speed reducing mechanism 202 may be of any suitable well known construction, comprising an output shaft 206 arranged at right angles with respect to the input shaft 200 and being adapted to rotatably carry a drive belt pulley 208 at the upper end thereof. A drive belt 210 extends around pulley 208 and also around an idler pulley 212 rotatably supported by means of a suitable vertically disposed shaft 214 at the forward end of support plate 178. As best seen in FIG. 4, shaft 214 is supported at its lower end by means of a suitable mounting block 216 which is in turn supported for longitudinal sliding movement on plate 178 in a conventional manner by means of a pair of longitudinal, spaced parallel guideways 218 and 220, thereby providing means for increasing or decreasing the tension of drive belt 210. Block 216 is provided with a forwardly extending, externally threaded adjustment screw 222 which extends through a fixed mounted abutment plate 224 secured to the forward end of the plate 178 by any suitable means. Adjustment screw 222 is provided with a plurality of adjustment nuts 226 which are adapted to be threadably mounted on and advanced longitudinally of the screw in order to effect longitudinal positioning of block 216 and pulley 212, and hence effect a tensioning or relaxing of drive belt 210.

Disposed substantially interjacent drive pulley 208 and idler pulley 212 are a plurality of backup rollers 228, 230 and 232 rotatably supported upon a plurality of longitudinally spaced, vertically extending support shafts 234, 236 and 238, respectively, the lower ends of which are fixedly mounted within a support frame 240 extending longitudinally of support plate 178 fixedly secured thereto by any suitable means. Backup rollers 228—232 are adapted to peripherally engage the inner face of drive belt 210 in the manner illustrated in FIG. 5, and drive belt 210 is in turn adapted to have the outer face thereof frictionally engage the adjacent faces of frictional elements 170 secured to conveyor pallets 12. Thus, it will be seen that upon rotation of drive belt 210, longitudinal movement will be imparted to friction element 170, resulting in longitudinal movement of conveyor pallets 12 along support structure 14.

In order to provide for positive frictional engagement of friction elements 170 with drive belt 210 during operation of the drive assembly, a plurality of pressure rollers 242, 244 and 246 are rotatably mounted upon support plate 170 at positions laterally aligned with backing rollers 228, 230 and 232, respectively. Pressure rollers 242, 244 and 246 are rotatably mounted upon suitable generally vertically extending support shafts 248, 250 and 252, respectively, supported in an identical manner hereinafter to be described so that a laterally compressive force or pressure is exerted against friction elements 170. As best seen in FIG. 2, shafts 248, 250 and 252 are supported intermediate the ends thereof by suitable pivot brackets 254 which in turn are pivotably supported upon the laterally inner side of a longitudinally extending pressure applying mechanism 256 by a plurality of pivot pins or the like 258. It will be seen that each of the shafts 248, 250 and 252 is adapted to pivot about the axis of its associated pivot pin 258 in a manner such that pressure roller 242, 244 and 246 supported on the upper ends thereof are moved toward or away from drive belt 210. Mechanism 256 comprises a generally U-shaped channel member 260 having laterally spaced inner and outer wall sections 262 and 264 and a bottom wall section 266 fixedly secured to the upper surface of support plate 178. Each of the shafts 248—252 is formed with an annular recessed portion 268 adjacent the lower end thereof, and inner wall section 262 is formed with a plurality of openings 270 which are longitudinally aligned, one with each of the shafts 248—252. Disposed within openings 270 are a plurality of helical tension springs, generally designated 272, which have their inner ends extending around recessed portions 268 of shafts 248—252. The outer ends of springs 272 are attached to the inner ends of a plurality of tensioning bolts, generally designated 274, the outer ends of which are externally threaded and extended through suitable openings 276 in outer wall section 264 of channel member 260, each of the openings 276 being aligned with a corresponding opening 270 in wall section 262. The outer ends of tensioning bolts 274 are provided with suitable adjustment nuts 278 adapted to be threadably advanced along bolts 274 to effect the lateral positioning of bolts 274 and thus the tension of springs 272. Nuts 278 therefore may be selectively advanced along bolts 274 so that a preselected outward force will be exerted by springs 272 on the lower ends of shafts 248—252, whereby pressure rollers 242, 244 and 246 will be biased laterally inwardly into peripheral engagement with friction elements 170 on conveyor pallets 12, thereby assuring positive frictional engagement of drive belt 210 therewith.

In operation, it will be seen that upon energization of drive motor 190, motive power will be transmitted through belt 196 to speed reducing mechanism 202, resulting in rotation of friction drive belt 210 around pulleys 208 and 212. Assuming that pressure rollers 242—246 are adjusted so as to exert an adequate amount of lateral force against friction elements 170, rotation of drive belt 210 will impart longitudinal movement to friction elements 170 and hence pallets 12. Of course, upon deenergization of drive motor 190, which may be achieved automatically or manually as desired, longitudinal movement of pallets 12 and the articles carried thereby along the conveyor will be terminated.

It is generally preferred that a flexible frictional material be used for friction elements 170 so that alignment between the drive assembly and the carriage is not critical, and will be accommodated by bending of the friction elements. In addition, the use of flexible friction elements permits locating drive assemblies at positions on the path of travel of the conveyor where such path is curving or turning. Where drive assemblies are not to be provided on turns and alignment is not considered a significant problem, rigid friction elements 170 are satisfactory. As used herein the expression "relatively high coefficient of friction" refers to surface coefficients of friction such as are found on rubber surfaces, the surfaces of rubber impregnated conveyor belts, brake linings, and the like, and which are sufficiently high to provide the transmission of necessary driving forces from the drive belt to the carriages.

From the above description, it will be seen that drive assembly 16 is of an extremely compact and simple design, thereby providing for convenient installation and minimum maintenance requirements. A particular feature of the above described design resides in the fact that the drive assembly takes up very little vertical spacing, thereby permitting support structure 14 and pallets 12 to be table mounted or mounted close to the floor, as previously mentioned. Another feature of the present invention resides in the fact that the drive assembly requires no lubrication between drive belt 210 and friction elements 170, thereby minimizing periodic maintenance and providing a sanitary environment whereby articles of food or the like may be conveyed without the possibility of being contaminated by lubricants or the like. Moreover, it will be noted that there is no metal-to-metal contact between drive belt 210 and friction elements 170, with the result that the conveyor assembly is considerably more quiet in operation than is possible with heretofore known and used drive systems incorporating, for example, sprocket and chain type arrangements. It will also be seen from the above description that assembly 16 may be conveniently installed at virtually and longitudinal position along the path of conveyor assembly 10, and that assembly 16 may be provided with a simple external housing having laterally spaced, longitudinally extending sidewalls 280 and 282, as indicated by the phantom lines in FIG. 2, to prevent dirt and other foreign material from entering and accumulating in the areas adjacent drive motor 190, speed reducing mechanism 202 and drive belt 210.

As previously mentioned, conveyor assembly 10 may be provided with a single drive assembly where the overall length of travel of the conveyor is relatively short, or where the articles to be conveyed are relatively light in weight; however, where the installation is relatively long, or the conveyed articles relatively large and/or heavy, one or more auxiliary "booster" drive assemblies 16 may be provided at longitudinally spaced locations along support structure 14 in order to provide additional driving power. Due to the simple design of drive assemblies 16, they may be conveniently added or removed in the event there is a change in the conveyor usage or path. Synchronization and electrical interlocks are not required between separate drive assemblies primarily because driving is not accomplished by any positive connection, but through frictional engagement, which inherently will permit some slippage between the driving and driven members if such be required to balance the system. Such slippage not only enables separate drive assemblies to share the load, but also is advantageous in that it permits gentle starts. If desire, the degree of slippage can be set by adjusting nuts 278 so that in the event of a jam the conveyor will slip and not destroy itself or the articles being conveyed, and added safety features of the present invention.

The conveyor of the present invention is not only particularly useful in conveying articles along a horizontal path but it is also adaptable to installations which incline with respect to the horizontal in order to also raise or lower the articles toward or away from various loading or unloading stations at different levels, or between the floors in a building. For such applications the conveyor assembly 10 may be modified in a manner hereinafter to be described so that the conveyor pallets can traverse upwardly and downwardly along an inclined path of travel such as shown schematically in FIG. 6. As will be described below in greater detail, when it is desired to convey articles along a path of travel which ascends or descends, support structure 14 and the conveyor pallets associated therewith are essentially the same as that described in connection with the previously described embodiment, with the exception of certain differences in the construction and mounting of conveyor platforms 70 and the means for operatively securing the rearward or trailing ends of each of the carriage frame members 82 to the forward or leading end of the next rearwardly adjacent pallet 12.

Referring now in detail to an ascending and descending embodiment of the present invention, as can be seen in FIGS. 6—9 there is provided a conveyor pallet 284 comprising a flat or planar upper article supporting platform 286. Platform 286 is substantially identical in overall shape and construction to the aforedescribed platforms 70 except for the fact that platform 286 is formed in two sections, a forward section 288 and a rearward section 290, separated by a laterally extending slot 292 defined by closely spaced parallel edges 294 and 296 formed along the rearward end of forward section 288 and the forward end of rearward section 290, respectively. Slot 292, best seen in FIG. 7, is located substantially in line with but slightly forwardly of a pair of swivel castor assemblies 298 and 300 which preferably are of the same construction as the aforedescribed castor assemblies 132 and 134. Assemblies 298 and 300 are fixedly secured to the lower face of rearward platform section 290 equidistant from the longitudinal center line of conveyor platforms 284, in the same manner as assemblies 132 and 134 are mounted on pallets 12.

Platform sections 288 and 290 are adapted to be hingedly or pivotably connected to one another by means of a pair of conventional hinge mechanisms 302 and 304 which are secured as by suitable screws or bolts 305 to the underside of the platform sections 288 and 290, with the result that forward platform section 288 is pivotal about a laterally extending hinge axis defined by assemblies 302 and 304. The upper side of platform 286 is preferably provided with a layer of a protective, resilient, friction and scuff resistant material 306, such as the aforedescribed material 80 on conveyor platforms 70, which material, by virtue of its inherent resilient character, will flex freely so as to not impair relative pivotal movement of platform sections. Material 306, besides functioning to prevent sliding, scuffing, scratching or the like to articles placed upon conveyor pallet 284, functions to prevent dirt, moisture or the like from accumulating in slot 292 so as to assure interference free pivotal action between the platform sections.

Conveyor platform or pallet 284 comprises a generally T-shaped carriage frame member 308 which is substantially identical in construction to the aforedescribed frame members 82 and includes a longitudinally extending section 310 and a pair of laterally outwardly extending arm sections 312 and 314 secured to the underside of rearward platform section 290 by means of suitable screws or bolts 316 and locating pins 318, in the same manner as arm sections 86 and 88 are secured to conveyor platform 70. As best illustrated in FIG. 9, the rearward end of frame section 310 is formed with an upwardly extending mounting section 320 which is similar in construction to section 122 of carriage frame 82, and has a central annular opening 322 adapted to receive and support the outer race 324 of a spherical bearing assembly, generally designated 326. Assembly 326 also comprises an inner race 328 fixedly mounted on the upper end of a connecting pin or shaft 330 disposed within an annular sleeve section 332 formed on the forward end of the next rearwardly adjacent carriage frame 308, sleeve section 332 and shaft 330 being similar to frame section 110 and shaft 114 of the aforedescribed conveyor pallets 12. It will be seen that the axis of the shaft 330 is longitudinally aligned with both the longitudinal center line of pallet 284 and slot 292. As will be described in connection with the overall operation of the conveyor pallet 284, spherical bearing assembly 326 is adapted to function to permit universal pivotal movement of the rearward end of carriage frame 308 with respect to the forward end of the carriage frame of the next rearward adjacent pallet, thereby permitting successive pallets to pivot upwardly and downwardly relative to one another as they traverse an ascending and descending path of travel while also being capable of traversing an arcuate path in a single plane.

Referring still to FIG. 9, the lower end of connecting shaft 330 is adapted to rotatably support an annular guide roller 334 which functions in the same manner as the aforedescribed guide rollers 116 in cooperating with a pair of laterally spaced longitudinally extending, spaced parallel guideway channel members, such as members 54 and 56 mounted centrally of the associated support structure (not shown). Guide rollers 334 are essentially the same in construction as the aforedescribed rollers 116, except that each roller 334 may be formed with an annular groove or recess 336 around the periphery thereof adapted to receive an inwardly extending elongated rib or projection (now shown) which may be provided along the inner sides of each of the associated guideway channels. Thus, guide rollers 334 may function as both a horizontal and a vertical guide means for the associated conveyor pallets 284 as they traverse along the conveyor support structure. Other than the provision of the ribs or projections adapted to cooperate with grooves 336 of guide rollers 334, the support structure for operatively supporting a series of conveyor pallets 284 is identical in construction to the aforedescribed support structure 14, although the support structure for defining the path of travel of pallets 284 may be inclined upwardly and downwardly, whereby the pallets 284 may function to convey articles to and from vertically as well as longitudinally spaced loading and unloading stations. In a preferred construction of the present invention, it has been found that pallets 284 may easily negotiate a 16° inclination or deinclination, although this angle may be varied in accordance with various installation requirements and the specific design of the components.

In order to assure that a relatively smooth continuous article supporting surface is maintained along the upper surface of the conveyor pallets 284 as the same are traveling over an upwardly or downwardly inclined section of the associated conveyor support structure, platform keeper means is provided interjacent the rearward edge of each of the conveyor platforms 286 and the forward edge of the next rearwardly adjacent conveyor pallet 284. In a preferred construction of the conveyor pallets 284 described herein, such keeper means comprises an elongated generally laterally extending keeper plate 338 having a main mounting section 340 which is substantially coextensive with and mounted on the lower face of rear platform section 290 of conveyor platform 286. As best seen in FIG. 9, the rearward edge of keeper plate 338 lies substantially along the circumference of a circle concentric with the rearward edge of platform 284, the rearwardmost edge portion 342 of the keeper plate being offset vertically downwardly from the plane of the lower face of platform 284. Edge portion 342 extends rearwardly of the rearward edge of the platform 286 and is adapted to be nestingly received within an elongated slot or recess 344 formed in an arcuate-shaped guideway member 346 fixedly secured by any suitable means to the lower side of the forward platform section 288 of the next rearwardly adjacent conveyor pallet 284. It will be seen that the recess 384 is slightly oversized with respect to keeper plate portion 342 so as to permit relatively free horizontal pivotal movement between members 338 and 346. It will be seen that as pallets 284 travel along a substantially horizontal path of travel, the forward or leading ends of forward platform sections 288 are supported upon keeper plates 338 of the next forwardly adjacent conveyor platform 286, as best illustrated in FIG. 9. Thus, although each entire conveyor platform 284 is supported in the same "3-point" manner, forward platform sections 288 of pallets 284 are supported at their rearward ends by means of hinge assemblies 302 and 304 and at their forward ends by means of keeper plates 338.

Operation of the conveyor system incorporating pallets 284 is substantially identical to the operation of the conveyor assembly 10, with one or more drive assemblies 16 being located at preselected longitudinal positions along the associated support structure for imparting longitudinal movement to pallets 284. In the event the associated support structure has either ascending or descending sections for guiding the conveyor pallets to a higher or lower levels, the forward platform sections 288 of each pallet is free to pivot upwardly and downwardly about the hinge axes, thereby permitting the conveyor pallets to negotiate such an inclining or declining portions while maintaining a relatively smooth and continuous upper load carrying surface, such as illustrated schematically in FIG. 6. Also, if desired, the drive assemblies may be energized to act as brakes, especially on descending runs, as an additional safety feature.

It will be seen from the above description that the present invention provides a new and improved conveyor assembly which is characterized by being extremely simple in design, economical in construction and which is adapted to follow virtually any path of travel, including straight and curved paths in a single plane (horizontal or inclined) and straight paths in climbing or descending paths not in a single plane. By virtue of the extremely compact, low profile design of the conveyor assembly of the present invention, said assembly will find wide and varied universal application, the modular or unitized construction thereof minimizing the time and effort required for layout and assembly. As previously mentioned, the unique drive arrangement incorporated in the conveyor assembly of the present invention obviates the need for any synchronization or electrical interlocks between multiple drive units, and the absence of any metal-to-metal contact between the various drive assemblies and conveyor pallets provides a construction which is extremely quiet in operation and requires an absolute minimum of lubrication or similar maintenance. In this regard it should be noted that in certain light duty installations one or more drive rollers having a frictional surface thereon may be used to drive the pallets, in lieu of the drive belt illustrated, with the same attendant advantages.

While it will be apparent that the preferred embodiments of the invention illustrated herein are well calculated to fulfill the objects above stated, it will be appreciated that such are susceptible to obvious modification, variation and change without departing from the proper scope or fair meaning of the subjoined claims.

I claim:

1. A conveyor system comprising: a plurality of pallets each having a load carrying surface, each of said pallets being comprised of two sections, means pivotally connecting the two sections of each of said pallets together, the pivot axis of said pallet sections extending transversely to the path of movement of said pallets, frame members, pivot means for pivotally connecting said frame members to one another in series, means for rigidly connecting each of said pallets to a respective one of said frame members with said load carrying surfaces being closely adjacent one another and providing a load carrying surface for the entire length of said series of interconnected frame members, means for guiding said frame members for movement along a predetermined path, driven means supported by said frame members, and powered driving means frictionally engaging said driven means to move said frame members and said pallets along said predetermined path.

2. A conveyor system as claimed in claim 1, wherein the pivot means transmits the driving forces from frame member to frame member.

3. A conveyor system as claimed in claim 1, wherein the driven means comprises a substantially flat relatively flexible material having a relatively high surface coefficient of friction.

4. A conveyor system as claimed in claim 1, wherein the driven means comprises a substantially flat relatively rigid material having a relatively high surface coefficient of friction.

5. A conveyor system as claimed in claim 1, wherein the driven means comprises a friction element fixed to each of the frame members, the driving means includes a powered belt having a driving surface having a relatively high coefficient of friction engaged with one side of said friction element, and a rotatable backup roller directly engaging the other side of said friction elements.

6. A conveyor system comprising: a plurality of frame members; a plurality of two section load carrying pallets, one such two section pallet being carried by each of said frame members; pivot means for pivotally connecting said frame members to one another in series; support means for guiding said frame members for movement along a predetermined path; means pivotally connecting to one another the two sections of each said pallet, the pivot axis of each said last-mentioned pivotal connection extending transversely to the path of movement of the conveyor; and powered driving means for moving said frame members along said predetermined path.

7. A conveyor system as claimed in claim 19, wherein said pallets have load carrying surfaces thereon, the load carrying surfaces on all of said pallets being closely adjacent one another and providing a substantially smooth and continuous overall load carrying surface for the entire length of said series of frame members.

8. A conveyor system as claimed in claim 19, wherein said pivot means includes spherical bearing means, whereby said frame members may pivot with respect to one another about two axes.

9. A conveyor system as claimed in claim 19, wherein one sections of each pallet is supported directly by said support means, and wherein the other of said sections is supported by the last-mentioned pivot means and by the one section of the next adjacent pallet.

10. A conveyor system as claimed in claim 24, wherein the support between the other section of each pallet and the one section of the next adjacent pallet comprises means preventing substantial relative vertical movement in both directions between said section and said adjacent pallet while permitting generally horizontal movement therebetween.

11. A conveyor system as claimed in claim 9, wherein said one section is provided with castor means rollingly engaging said support means.

12. A conveyor system comprising: a plurality of pallets each having a load carrying surface, frame members, pivot means for pivotally connecting said frame members to one another in series, means for rigidly connecting each of said pallets to a respective one of said frame members with said load carrying surfaces being closely adjacent one another and providing a load carrying surface for the entire length of said series of interconnected frame members, means for guiding said frame members for movement along a predetermined path, driven means supported by said frame members, and powered driving means frictionally engaging said driven means to move said frame members and said pallets along said predetermined path said frame members being elongated and having a pair of spaced arms that are rigidly connected to the pallets.

13. A conveyor system as set forth in claim 32 wherein the driven means comprise generally planar friction members affixed to and depending from the frame members.

14. A conveyor system comprising: a plurality of pallets each having a load carrying surface, frame members, pivot means for pivotally connecting said frame members to one another in series, said pivot means including spherical bearing means for providing for universal pivotal movement between said frame members, means for rigidly connecting each of said pallets to a respective one of said frame members with said load carrying surfaces being closely adjacent one another and providing a load carrying surface for the entire length of said series of interconnected frame members, means for guiding said frame members for movement along a predetermined path, said pivot means including a shaft pivotally connecting the leading edge of each frame member with the trailing edge of the adjacent frame member, roller means carried by each of said shafts, said roller means being engageable with guide means for providing the means for guiding said frame members for movement along said predetermined path, driven means supported by said frame members, and powered driving means frictionally engaging said driven means to move said frame members and said pallets along said predetermined path.

15. A conveyor system comprised of a pallet having an upper surface adapted to support a load, a frame member disposed beneath said pallet, means for rigidly affixing said frame member to said pallet for establishing a driving relationship therebetween, and a friction member affixed to and depending from said frame member for engagement by a frictional drive for driving said frame member and said pallet along a conveyor path, said frame member being generally elongated and carrying a shaft at one end thereof for providing a pivotal connection to a next adjacent frame member for pivotally connecting a group of such frame members together and spherical bearing means at the other end for receiving the shaft of a next adjacent frame member for providing a universal pivotal connection between the frame members.

PO-1050
(5/69)

UNITED STATES PATENT OFFICE
CERTIFICATE OF CORRECTION

Patent No. 3,554,360            -Dated January 12, 1971

Inventor(s) Jorgen S. Bildsoe

It is certified that error appears in the above-identified patent and that said Letters Patent are hereby corrected as shown below:

Column 3, line 6, the obscured number after "pallets" should be -- 12 --.

Column 10, line 9, "and" should be -- any --.

Column 13, line 65, "19" should be -- 6 --.

Column 13, line 71, "19" should be -- 6 --.

Column 14, line 4, "19" should be -- 6 --.

Column 14, line 9, "24" should be -- 9 --.

Signed and sealed this 27th day of April 1971.

(SEAL)
Attest:

EDWARD M. FLETCHER, JR.
Attesting Officer

WILLIAM E. SCHUYLER, JR.
Commissioner of Patents

PO-1050
(5/69)

UNITED STATES PATENT OFFICE
CERTIFICATE OF CORRECTION

Patent No. 3,554,360     Dated January 12, 1971

Inventor(s) Jorgen S. Bildsoe

It is certified that error appears in the above-identified pat and that said Letters Patent are hereby corrected as shown below:

Column 14, line 32, "32" should be -- 12 --.

Signed and sealed this 17th day of October 1972.

(SEAL)
Attest:

EDWARD M. FLETCHER, JR.
Attesting Officer

ROBERT GOTTSCHALK
Commissioner of Patent

UNITED STATES PATENT OFFICE
CERTIFICATE OF CORRECTION

Patent No. 3,554,360      Dated January 12, 1971

Inventor(s) Jorgen S. Bildsoe

It is certified that error appears in the above-identified patent and that said Letters Patent are hereby corrected as shown below:

Column 14, line 33, "32" should be -- 12 --.

Signed and sealed this 3rd day of December 1974.

(SEAL)
Attest:

McCOY M. GIBSON JR.
Attesting Officer

C. MARSHALL DANN
Commissioner of Patents